United States Patent

Hahn et al.

[11] Patent Number: 5,424,461
[45] Date of Patent: Jun. 13, 1995

[54] PREPARTION OF 1-AMINO-4-HYDROXYANTHRAQUINONE

[75] Inventors: Erwin Hahn, Heidelberg; Manfred Patsch, Wachenheim; Heike Kilburg, Speyer, all of Germany

[73] Assignee: BASF Aktiengesellschaft, Ludwigshafen, Germany

[21] Appl. No.: 165,464

[22] Filed: Dec. 13, 1993

[30] Foreign Application Priority Data

Dec. 16, 1992 [DE] Germany ............. 42 42 488.7

[51] Int. Cl.⁶ ............. C07C 225/36; C09B 1/503
[52] U.S. Cl. ............. 552/243
[58] Field of Search ............. 552/243

[56] References Cited

U.S. PATENT DOCUMENTS 2,183,652 12/1939 Lord et al. ............. 552/243

FOREIGN PATENT DOCUMENTS 307855 12/1988 Japan ............. 552/243
158831 12/1932 Switzerland .
640873 11/1979 Switzerland .

OTHER PUBLICATIONS

Foster, The Elements of Chemistry, 1937, p. 181.

*Primary Examiner*—Howard T. Mars
*Assistant Examiner*—Rebecca Cook
*Attorney, Agent, or Firm*—Keil & Weinkauf

[57] ABSTRACT

A process for preparing 1-amino-4-hydroxyanthraquinone by treating 1,4-dihydroxyanthraquinone with ammonia in an aqueous medium comprises treating with ammonia in the presence of a base and of a catalytic amount of a reducing agent at from 60° to 150° C. and at from 1 to 30 bar.

5 Claims, No Drawings

PREPARTION OF 1-AMINO-4-HYDROXYANTHRAQUINONE

The present invention relates to a novel process for preparing 1-amino-4-hydroxyanthraquinone by treating 1,4-dihydroxyanthraquinone with ammonia.

CH-A-640 873 describes the reaction of 1,4-dihydroxyanthraquinone with ammonia in aqueous phase to form 1-amino-4-hydroxyanthraquinone.

It is an object of the present invention to provide a novel process for preparing 1-amino-4-hydroxyanthraquinone from 1,4-dihydroxyanthraquinone whereby the target product is obtained in a simple manner and in high yield and purity.

We have found that this object is achieved by a process for preparing 1-amino-4-hydroxyanthraquinone by treating 1,4-dihydroxyanthraquinone with ammonia in an aqueous medium, which comprises treating with ammonia in the presence of a base and of a catalytic amount of a reducing agent at from 60° to 150° C. and at from 1 to 30 bar.

The amount of ammonia used per mole of 1,4-dihydroxyanthraquinone is in general from 3 to 20 mol, preferably from 5 to 12 mol. The ammonia can be used in the form of an aqueous solution or in its liquid state. The use of an aqueous solution of ammonia is preferred. Of particular interest are aqueous solutions which, based on the weight of the solution, contain from 1 to 35% by weight, preferably from 20 to 30% by weight, in particular about 25% by weight, of ammonia.

Examples of suitable reducing agents are alkali metal dithionites, such as lithium dithionite, sodium dithionite or potassium dithionite, hydroxyacetone, thiourea S,S-dioxide and alkali metal sulfites, such as lithium sulfite, sodium sulfite or potassium sulfite. The use of an alkali metal dithionite, in particular sodium dithionite, is preferred.

According to the invention, the reducing agent is used in a catalytic amount. Per mole of 1,4-dihydroxyanthraquinone the amount of reducing agent used is in general from 0.01 to 0.3 mol, preferably from 0.05 to 0.1 mol.

A base is also present in the process of the invention. Suitable bases are in particular inorganic bases, for example alkali metal hydroxides, alkali metal carbonates or alkali metal bicarbonates. Specific examples are lithium hydroxide, lithium carbonate, lithium bicarbonate, sodium hydroxide, sodium carbonate, sodium bicarbonate, potassium hydroxide, potassium carbonate and potassium bicarbonate.

The use of an alkali metal hydroxide, in particular sodium hydroxide or potassium hydroxide, is preferred, the use of sodium hydroxide being particularly preferred.

The base can be used in a solid form or preferably in the form of an aqueous solution. The aqueous solution will in general have a concentration of from 10 to 80% by weight, preferably from 25 to 50% by weight, each percentage being based on the weight of the solution, of base.

The amount of base used per mole of 1,4-dihydroxyanthraquinone is in general from 1 to 5 mol, preferably 2 to 3 mol.

The novel process is carried out in an aqueous medium. Per part by weight of 1,4-dihydroxyanthraquinone it is customary to use from 3 to 10 parts by weight, preferably from 4 to 7 parts by weight, of water as the reaction medium. (If the ammonia and the base are each used in the form of an aqueous solution, the water present therein is in each case allowed for in the values mentioned.)

The novel process is advantageously carried out from an initial charge comprising 1,4-dihydroxyanthraquinone, water, base and reducing agent. If an aqueous solution of ammonia is used, it can likewise form part of the initial charge. If liquid ammonia is used, it can be added to the sealed apparatus using appropriate metering means.

After the reaction apparatus has been sealed pressure-tight, the reaction mixture is heated to 60°–150° C., preferably 80°–120° C. giving rise to an autogenous pressure of from 1 to 30 bar. If the aqueous solution of ammonia used is about 25% in strength by weight, the autogenous pressure is preferably from 2 to 3 bar.

After a period of from 2 to 3 hours at the abovementioned temperature, the reaction will in general have ended, and the apparatus is cooled down to room temperature and depressurized. The 1-amino-4-hydroxyanthraquinone is obtained as a precipitate and can be separated off, washed and dried.

The novel process, which can be carried out continuously as well as batchwise, produces 1-amino-4-hydroxyanthraquinone in high purity and yield.

1-Amino-4-hydroxyanthraquinone is a useful intermediate for synthesizing anthraquinone dyes or precursors thereof. For instance, by reacting it with only one equivalent of chlorine it is possible to obtain 1-amino-2-chloro-4-hydroxyanthraquinone, from which it is possible to obtain for example 1-amino-2-phenoxy-4-hydroxyanthraquinone (C.I. Disperse Red 60 (60 756)).

The Examples which follow illustrate the invention.

EXAMPLE 1

79.5 g of 1,4-dihydroxyanthraquinone, 210 ml of water, 5.6 g of sodium dithionite, 60 g of 50% strength by weight sodium hydroxide solution and 240 g of 25% strength by weight ammonia solution were introduced into a pressure-resistant apparatus. The apparatus was then sealed pressure-tight and its contents were heated to 100° C., giving rise to an autogenous pressure of 2.5 bar. The reaction mixture was held under these conditions for 3 h, then cooled down and depressurized. The precipitate found was filtered off with suction, washed salt-free with water and dried to leave 74.9 g of 1-amino-4-hydroxyanthraquinone (purity according to GC: 90.7%).

EXAMPLE 2

70 ml of water, 26.5 g of 1,4-dihydroxyanthraquinone, 1.2 g of hydroxyacetone, 80 g of 25% strength by weight aqueous ammonia solution and 20 g of 50% strength by weight sodium hydroxide solution were introduced into a pressure-resistant apparatus. The apparatus was then sealed pressure-tight and its contents were heated to 100° C., giving rise to an autogenous pressure of 2.7 bar. The reaction mixture was held under these conditions for 3 h, then cooled down and depressurized. The precipitate found was filtered off with suction, washed salt-free with water and dried to leave 15.8 g of 1-amino-4-hydroxyanthraquinone (purity according to GC: 71.1%).

EXAMPLE 3

70 ml of water, 26.5 g of 1,4-dihydroxyanthraquinone, 5 g of sodium dithionite and 20 g of 50% strength by weight sodium hydroxide solution were introduced into a pressure-resistant apparatus, which was then sealed pressure-tight. Then 20 ml of liquid ammonia were injected and the reactor contents were heated to 100° C., giving rise to an autogenous pressure of 25 to 30 bar. The reaction mixture was held under these conditions for 3 h, cooled down and depressurized. The precipitate was filtered off with suction, washed salt-free with water and dried. Yield: 21.5 g of 1-amino-4-hydroxyanthraquinone (purity according to GC: 80%).

The same method was employed to carry out Examples 4 to 6, which are characterized by the following parameters:

EXAMPLE 4

70 ml of water, 26.5 g of 1,4-dihydroxyanthraquinone, 2.8 g of sodium dithionite, 80 g of 25% strength by weight aqueous ammonia solution, 20 g of 50% strength by weight sodium hydroxide solution; reaction time: 3 h, reaction temperature: 80° C.; yield: 22 g (purity according to GC: 70.2%).

EXAMPLE 5

110 ml of water, 26.5 g of 1,4-dihydroxyanthraquinone, 2.8 g of sodium dithionite, 40 g of 25% strength by weight aqueous ammonia solution, 20 g of 50% strength by weight sodium hydroxide solution; reaction time: 3 h, reaction temperature: 100° C.; yield: 25.1 g (purity according to GC: 80%).

EXAMPLE 6

70 ml of water, 26.5 g of 1,4-dihydroxyanthraquinone, 2.8 g of sodium sulfite, 60 g of 25% strength by weight aqueous ammonia solution, 20 g of 50% strength by weight sodium hydroxide solution; reaction time: 3 h, reaction temperature: 100° C.; yield: 24.8 g (purity according to GC: 85.8%).

We claim:

1. A process for preparing 1-amino-4-hydroxyanthraquinone which comprises heating an aqueous mixture consisting essentially of water, 1,4-dihydroxyanthraquinone, ammonia, a base and a catalytis amount of reducing agent selected from the group consisting of alkali metal dithionites, alkali metal sulfites, hydroxyacetone and thiourea S,S,-dioxide to a temperature of 60° to 150° C. at a pressure of 1 to 30 bar.

2. A process as defined in claim 1, wherein the ammonia is used in the form of an aqueous solution.

3. A process as defined in claim 1, wherein the amount of ammonia used per mole of 1,4-dihydroxyanthraquinone is from 3 to 20 mol.

4. A process as defined in claim 1, wherein the base used is an alkali metal hydroxide.

5. A process as claimed in claim 1, wherein the reducing agent used is an alkali metal dithionite.

* * * * *

UNITED STATES PATENT AND TRADEMARK OFFICE
CERTIFICATE OF CORRECTION

PATENT NO. : 5,424,461
DATED : June 13, 1995
INVENTOR(S) : HAHN et al.

It is certified that error appears in the above-indentified patent and that said Letters Patent is hereby corrected as shown below:

In the title, item [54], correct the spelling of "PREPARATION".

Column 4, claim 1, line 4, delete "catalytis" and substitute --catalytic--.

Signed and Sealed this

Twenty-ninth Day of August, 1995

Attest:

BRUCE LEHMAN

*Attesting Officer*     *Commissioner of Patents and Trademarks*